United States Patent Office 3,211,619
Patented Oct. 12, 1965

3,211,619
PIGMENTED WAX COMPOSITIONS
Francis Buchwalter, New Rochelle, and Raymond Stetzer, Roslyn Heights, N.Y., assignors to Revlon, Inc., New York, N.Y., a corporation of Delaware
No Drawing. Filed Dec. 29, 1961, Ser. No. 163,046
10 Claims. (Cl. 167—85)

This invention relates to molded wax or extruded compositions having therein a substantial proportion of colored or other pigment or filler particles and, more particularly, to the manufacture of such wax articles of enhanced strength and other characteristics from molten wax compositions having uniformly dispersed therein solid particles of colored or other pigments or fillers especially treated for producing enhanced dispersion, strength, coloring, and other characteristics in articles made from such molten wax compositions.

In the manufacture of various molded (including extruded) articles from molten wax materials, a dispersed phase of solid pigment or filler particles may be incorporated into the molten wax materials and the articles molded therefrom in order to provide or enhance such characteristics of the finished wax articles as colored pigmentation, marking properties, a matrix structure of enhanced strength characteristics, etc., for providing or enhancing the utility of the molded articles for their intended purpose. Whether such solid pigment particles are included for providing or enhancing coloring characteristics or for providing a particulate matrix for the solid or crystalline structure of the wax article, some difficulty may be experienced in obtaining and maintaining optimumly uniform and complete distribution or dispersion of solid pigment particles throughout the molten wax material and the article molded therefrom and/or in preventing undesired agglomeration or segregation of the solid particle phase in the wax material to an extent disruptive of the ultimate coloring or strength enhancing effects desired.

Thus, considering a situation where it is desired to have an inorganic pigment or filler particle phase dispersed uniformly through a wax matrix in a molded article formed by casting a molten liquid wax material with the solid particle phase dispersed therethrough, the surface tension or other inherent characteristics of the particulate phase may be sufficiently incompatible with the molten wax composition to resist desirably uniform dispersing therethrough, at least with desirably fine particle size, and/or may give rise to a situation where, although the particle phase is initially dispersed in the molten or liquid wax material, some agglomeration or segregation of the solid phase occurs during the cooling and solidification of the composition in casting or molding the desired finished article.

If it is attempted to increase the uniformity of dispersion of such solid particles through such a wax composition merely by altering the surface tension of the wax-solid interfaces as by treating either the wax material or the particle surfaces with a surfactant, some improvement in the original dispersing characteristics may be noted, but the surface active nature of such a treatment may also produce the ancillary and undesired effect of softening or weakening the wax matrix of the finished article or otherwise disadvantageously altering some other characteristic of either the finished article or the pigment particles therein.

Particularly where the strength or hardness of the molded article is of important significance or where visual or coloring effects of the dispersed pigments or other coloring materials in the article are important or where the use of the finished article may be affected by alteration of such characteristics as pH or water sensitivity, etc., the addition of surfactant materials to either the molten wax or the pigment particles may actually have a net disadvantageous effect on the finished article, no matter how much such treatment may enhance the initial dispersion of the solid phase in the molten wax. Especially if the finished wax article is to be used to impart color as by marking or depositing color or dye or pigment to another surface, surfactant or other materials or treatments provided primarily for controlling or enhancing dispersion of the pigment in the molten wax during formation of the article may be found to exercise undesired changes or effects in the coloring or other useful results produced by the finished article, and to such an extent as to outweigh whatever advantage may be obtained initially in the original dispersion of the pigment or formation or manufacture of the finished molded article.

According to this invention, however, molded wax articles having dispersed therethrough a solid discrete pigment or filler particle phase are provided, as cast or molded from a molten dispersion of the solid particle phase in molten wax materials, wherein the finished article is of demonstrably enhanced strength and crush resistance and with the solid particle phase uniformly dispersed through the solid wax article matrix or crystalline structure, and having the individual particles of at least a substantial or preponderant portion of the particulate solid pigment or filler phase preliminarily treated or coated with a hydrophobic and oleophilic material such as a water insoluble metal salt of a fatty acid. As a further feature of this invention, particularly with regard to such pigmented molded wax articles as are to be used for coloring or marking purposes and having coloring components including or in addition to the dispersed solid particulate phase treated in accordance herewith, there is also provided for enhancing or developing the coloring effects or results of such materials both as used and in the preparation or manufacture of such wax articles in accordance herewith.

With the foregoing and other objects in view, this invention will now be more particularly described, and other objects and advantages thereof will be apparent from the following description and the appended claims.

Although it is to be understood that this invention is applicable to a wide variety of molded and pigmented wax articles for a variety of purposes or uses, the particular enhanced advantages hereof may be most adapted or apparent regarding such wax articles for uses involving depositing or applying a portion of the wax article or the pigment or other components thereof to another surface by rubbing or otherwise contacting the surface with the article for imparting color or other purposes—e.g., cosmetic lipsticks, other wax-base cosmetic or makeup preparations or "stick," marking crayons, and the like. Merely for purposes of illustration here, however, the following description will be related primarily to the application of this invention to colored lipsticks and the manufacture thereof as particular embodiments of this invention and illustrative of the practicing thereof, although it is to be understood that this invention and the teachings hereof are not limited to such lipsticks.

Generally, as will be understood, the manufacture of colored lipsticks for imparting to the lips a colored pigmented or dyed stain or colored covering layer involves dispersing pigment coloring matter in a molten wax composition, and then casting the molten composition into the cylindrical or other form desired for the lipstick so that when the finished lipstick is touched or rubbed on the lips, the desired colored covering layer will be applied thereto. The coloring matter may include both pigments and dyes, and most usually includes a mixture of both to achieve the particular color or shade desired. The final blend of coloring pigment materials may sometimes include a preponderant proportion of a white pigment, such as titanium dioxide, as the principal building or covering component of the wax material for application to the lips, and may also include a dye material generally for the purpose of staining the lips beneath the applied pigmented wax composition for extending or supplementing the principal covering and coloring effect of the applied layer.

For optimum results, then, it is desired to disperse the various pigment materials in the molten wax for uniform distribution and to have the uniformity of such distribution maintained during the period of time while the molten wax is cooling and solidifying in the mold. Similarly, it is desired that the finished article have enough hardness or strength or rigidly to be self-sustaining and able readily to withstand the normal handling in use, and to accomplish such physical or mechanical goals in a manner which does not interfere with the more or less independent considerations of achieving exactly the shade or color desired and applying a coloring layer to the lips for adequate coverage and adherence thereto over a desirably prolonged time notwithstanding possible additional independent effects of physiological substances or conditions on the final coloring result.

Thus, there are a variety of complicating and limiting unrelated factors or considerations peculiarly involved in the manufacture of lipsticks and arising substantially independently from several different sources and exercising conflicting or degrading effects on the ultimate result desired. First of all, there are the usual factors and difficulties encountered with attempting to disperse particulate inorganic pigments in any liquid oily or waxy material in the first place, as well as the perhaps related considerations of maintaining the dispersion and producing the desired matrix or solid structure. Additionally, there are the purely optical or coloring considerations involving the production of a precise color shade throughout the entire wax composition and notwithstanding the fact that the final effect is only produced by an exacting blending of different pigment and dye materials of different colors and intensities, as well as the known factor that the final optical color effect of any particular blend of pigments and dyes may be noticeably altered by changing conditions of temperature or moisture or pH in either the liquid vehicle in which the color is first formed or after application of a film of the colored material to a particular surface. Further, there are inevitable and purely physiological conditions regarding the lips to which a lipstick is applied (e.g., the character and pH of human skin, the effect of skin oils therein on an applied oily or waxy colored layer, repeated contact with aqueous material such as saliva, etc.) which introduce further complications quite independent of the noted chemical or mechanical or optical factors otherwise incident to blending colors in a vehicle or to dispersing inorganic particles in an oily phase for other purposes and in other arts.

For example, the initial dispersion of the various particulate solid or pigment materials in the molten wax might be aided by a variety or advantageous techniques known generally in connection with dispersion of the particles in an oily liquid, such as treating either the molten wax liquid or the pigment particles so as to alter whatever surface tension characteristics thereof inherently resist obtaining the desired complete and uniform dispersion; but such treatments have also been found to alter the matrix or strength characteristics of the solidified molten article to a point where it is not sufficiently or desirably strong or self-sustaining, and may even produce the further disadvantage in the colored layer applied to the lips of permitting or even enhancing separation or segregation of vehicle from the pigment leaving cakey pigment on the lips to an unsightly extent.

Similarly, from the purely optical or color preparation standpoint, if the colored pigment or the vehicle is treated in a conventional manner to enhance the brilliance or transparency of the coloring, as by increasing the oil adsorption of the system to promote "livering," the gelling action incident thereto in the oily vehicle may render the composition difficult to pour or mold even while molten and/or so soften the waxy material, even when cooled, as to prevent the production of a desirably strong or hard lipstick form. Additionally, and more or less independently of any of the foregoing conflicting considerations and whatever chemical or physical expedients may be attempted to alleviate or coordinate them, the inevitable and physiological conditions of the lips themselves interject further complications which are not accommodated or alleviated by any of the foregoing expedients, such as, for example, causing a further and pronounced color change or "development" in some of the coloring materials as they are exposed to the relatively alkaline pH of the lips and/or having portions of the oily or waxy vehicle spread or absorbed along the essentially oleophilic surface of the skin to leave behind portions of the pigment in an unsightly or "caked" segregation, etc.

In accordance herewith, however, satisfactory and enhanced results are achieved in the manufacture of pigmented wax articles such as lipsticks by subjecting the solid pigment or filler particles, or at least a substantial or perponderant proportion thereof, to a preliminary treatment or surface coating with a hydrophobic and oleophilic water-insoluble organo-metal material, such as a water insoluble metal salt of a fatty acid, and providing such treatment for the solid particulate phase prior to admixing or dispersing in the liquid or molten wax phase of the composition. Although such treatment is applied preliminarily to the solid particle phase before incorporating it in the wax composition and/or with other ingredients desired therefor, it has been found that such an insoluble fatty acid salt reacts or interacts synergistically with other of the ingredients in the whole composition to produce certain of the additional advantages of this invention perhaps quite independently of the fact that the treating material is first applied to or carried by the solid particles, and, conversely, produces additional advantages (or avoids disadvantages otherwise occurring) primarily because it is incorporated with or on the solid particle phase in the composition instead of being initially or ultimately dissolved in or carried by the liquid or molten wax phase exclusively.

Although complete understanding of all the aspects and mechanics of the reactions or interactions involved in accordance herewith may not be completely known, useful explanation or hypothesis may be suggested for some of the advantageous aspects of procedures and results embodying and for practicing this invention. For example, considering an insoluble metallic soap such as calcium resinate (or calcium abietate), it may be noted that a deposit or coating of such material on the surfaces of solid pigment particles may have some effects in the initial dispersing thereof in an oily or waxy vehicle because of the water repellent characteristics of such an insoluble soap. Indeed, such materials may be used for imparting some hydrophobic characteristics to solid pigment particles to enhance somewhat the ease with which such particles may be transferred from a water slurry into an oil dispersion phase. Such uses are to be distinguished from techniques in accordance herewith where sufficient of the treating is included in the final dispersed formulation, although all included as carried by the solid particles, to render the solid particles actually oleophilic, rather than merely water repellent, and, further, to react or interact positively with the waxy vehicle, both in the liquid or molten form thereof and subsequently as controlling or influencing the type of grain or crystal or micelle structure developed, as well as to react or interact independently and cooperatively with other ingredients of the composition and with external media or conditions with which the finished composition may come in contact during use and after the manufacture thereof.

Thus, such material as calcium resinate exhibits a discernibly alkaline pH. If the lipstick composition also includes dye materials which may be slightly water-soluble and somewhat acidic (e.g., brome dyes of the bromofluorescene type) which undergo a change of color or shade upon being deposited from an oil solution into an aqueous alkaline medium, such change is pre-formed or pre-reacted to develop the alkaline color from the acid dye in the wax composition. Otherwise, the shade or color produced by applying such dye to the slightly alkaline pH conditions of the lips may produce a color change or shade variation after application of the lipstick which is different from the color or shade as it appears in the wax composition itself prior to application, which latter color or shade is, presumably, the particular one desired by the person using the lipstick.

There is similarly to be distinguished from the purely dispersing or surfactant or hydrophobic mechanism of such treating materials on inorganic particles in an oil vehicle additional unexpected results or advantages with, for example, the waxy phase of the molded article, either in the molten form or after solidification. For example, with substantial proportions of treating material such as calcium resinate on the solid particle phase and considerably in excess of amounts which might be sufficient merely to contribute some hydrophobic characteristics to the particles, there may be noted in the pigmentation or coloration produced an increase in brilliance or intensity perhaps, but without either the expected and concomitant gelling of the liquid wax vehicle or the softening of the solidified micelle matrix associated with conventional techniques.

Indeed, the specific addition here of such insoluble metal soap materials to wax compositions on or with the solid particle phase (and/or the presence of a reactive basic metal ion in the pigment phase) actually produces in accordance herewith substantially stronger or harder and more rigid internal grain or crystalline structure in the molded wax composition, perhaps resulting from some actual transesterification with the wax compositions, more uniformly or uniting various wax materials in the composition and/or even producing some saponification of acidic materials not normally achieved in the absence of a suitably reactive alkaline material.

Nevertheless, such phenomena and the enhanced results achieved thereby or attributed thereto with regard to the structure and strength of the finished article in accordance herewith have been found to involve relatively delicately balanced interaction between the wax materials and the alkaline soap treatment. Thus, a similar enhancement has been found not to occur if some such reactant is added to the wax ingredients either before or after but separately from the solid particle phase, and, indeed, such separate inclusion not only fails to achieve the results desired here but even interferes with or diminishes the strength characteristics or structure which would be achieved without any addition of such insoluble or alkaline soap materials at all. Neither the enhanced coloring effect nor the enhanced strength or structure characteristics have been achieved with other conventional materials as dispersing agents; nor have either the dispersing or color enhancing or strength enhancing advantages hereof been all achieved or improved to the desired optimum degree by the addition of treating materials, even those here preferred, to the compositions separately from the solid particle.

Molded wax compositions in accordance herewith may be formed from a mixture of a variety of wax and oil materials, and preferably of a blend of several of such materials, as a ready means of achieving a particular melting point and consistency and other characteristics desired in the finished composition depending upon the particular use to which it is to be put, all in known manner. Although synthetic wax materials may conveniently be blended or formulated to achieve a wide variety of desired ultimate characteristics for molded wax articles in accordance herewith, various of the natural waxes and oils may be preferred, particularly, for articles such as lipsticks or makeup or cosmetic preparations for human use, because of the accredited physiological acceptance of such materials or preparations to be applied to the human body.

Mixtures or blends of various animal and vegetable waxes, such as beeswax, lanolin, spermaceti, candelilla, carnauba, etc., as well as mineral waxes such as paraffin, and the petroleum crystalline and the microcrystalline waxes, etc., have been found satisfactory for the production of pigmented wax articles of the character to which this invention relates, and as mixed or blended with various natural or synthetic liquid waxy or oil materials such as castor oil, liquid lanolin, liquid petrolatum, etc., as well as various fatty acid ester liquid or solvent materials, to achieve the desired consistency characteristics for blending and molding as well as the desired range for the melting point or softening or solidification temperatures. The various solid petroleum waxes and the various vegetable waxes have different ranges of melting points and other waxes have substantially lower softening points, and the various oil and ester materials mentioned may be generally liquid at room temperatures. If it is desired to achieve a molded composition having a melting point or softening range in the vicinity of, for example. 70° C. for a lipstick composition, such condition is readily achieved in known manner by mixing or blending proportions of a variety of different wax materials having different softening points.

Into such wax compositions is to be incorporated, in accordance herewith, a substantial proportion of a solid particle phase of pigment or filler material, whether for providing coverage and coloring in a layer applied to another surface or as merely providing a particulate matrix in the solidified wax material. Although coloration is, of course, one of the principal results desired with a lipstick or makeup article, the covering or hiding capacity is also of such importance as to require the presence of a substantial amount of covering pigment, whether colored or not, to provide the desired result. Generally, the particular color shade or other optical effects desired, especially with lighter shades, would not be achieved if all the pigment material necessary for adequate covering or opacity of the applied layer were colored. Accordingly, as is well understood, such pigmented wax formulations may be built around a pigment blend including a substantial or preponderant proportion of a white pigment material, such as titanium dioxide, blanc fixe, zinc oxide, etc., whether considered as so-called "transparent" pigments or "opaque" from the standpoint of surface coverage. This invention is also to be understood as applicable to wax articles having various other white pigment materials (e.g., whiting, lead pigments, lithopone, chalk, barytes, etc.) as well as to various solid particle mineral fillers (e.g., talc, kaolin, silica, etc.), even though such materials may not usually be preferred for incorporation into a lipstick or cosmetic composition.

With such "white" pigment and covering or filler materials, then, is blended sufficient or one or more of a variety of well known natural or synthetic colored inorganic pigments and/or organic lakes or toners, all in known manner and as may be desired. In the usual instance, such colored pigments may well be present in but minor proportions as compared with the white pigment or filler material or builder. Although the preliminary treatment of a dispersed solid particle phase in accordance herewith is to be understood as effectively applicable to both white and colored particles in the pigment blend, satisfactory results are achieved when the insoluble fatty acid salt treatment is applied only to the preponderant white pigment portion of the solid particle phase, and such an arrangement may produce enhanced manufacturing convenience or economies in situations where wax articles of a variety of different shades or colors are manufactured from a standard mixture or dispersion of white pigment in molten waxy materials merely by adding additional pigment blends to different batches of the standard mixture to achieve the different color effects desired.

As noted above, water-insoluble metallic soaps or metal salts of fatty acids are generally illustrative of the oleophilic treating materials with which satisfactory results are achieved in accordance herewith in the preliminary treating or coating of the solid particles of the pigment or filler phase prior to admixing or dispersing in liquid or molten wax compositions. Such insoluble soap materials may include, as illustrative, calcium, aluminum, zinc, barium, magnesium, etc., salts of various fatty acids forming with one or more of such metals a water insoluble material and including, among others, abietic (or resin acid), stearic, linoleic, oleic, etc., acids. Such materials may be considered as generally water repellent, but it is preferred to use in accordance herewith those of the noted materials or types of materials which are also most olephilic and/or to apply to the pigment particles being treated sufficient of the treating material to produce truly oleophilic characteristics on the particles more than merely altering surface characteristics thereof just to make the solid particles less hydrophilic or barely hydrophobic than they are inherently. It is also preferred to select those of such metal salts which impart to the final wax composition a slightly alkaline pH.

Also, satisfactory results are achieved in accordance herewith by depositing the insoluble soap treating material onto the surface of the individual particles of the solid pigment in a water slurry of the latter preliminarily to admixture with the waxy materials of the composition. As illustrative, water-soluble acid salt (e.g., sodium resinate) is added to a water slurry of the solid pigment and thoroughly admixed therewith, after which there is added a metal salt or other reactant (e.g., calcium chloride) for reaction with the soluble soap in the slurry to form or precipitate on the pigment particles the desired insoluble soap (e.g., calcium resinate) as a coating or layer thereon. Thereafter, the treated pigment may be separated in known manner (as by washing and filtering) from the water of the slurry and any undesired chemical or other constituents therein, and dried or otherwise treated for dispersing in or admixture with the wax and other materials of the composition. In some instances the pigment itself may be such as will react chemically with a soluble soap to form an insoluble fatty acid metallic salt desired (e.g., zinc oxide pigment reacting with sodium stearate to form insoluble zinc stearate), but it is preferred not to rely on such a reaction or to select such reactants to form the desired treatment pigment in accordance herewith because, for example, it is not desired to use up substantial portions of the pigment in forming the insoluble metal salt, and it is desired to deposit as a coating on the pigment particles a substantial amount of the fatty acid metal salt for achieving the various enhanced advantages and results in accordance herewith. Actually, when utilizing pigments which inherently may possess some appreciable reactivity for either the metal ion of some insoluble soap materials or the soluble precursors thereof, it is preferred to select a particular fatty acid and a particular insoluble salt thereof with which the pigment is not reactive in order to assure that sufficient of the insoluble soap will be deposited on the pigment particles to be available for participation in the various reactions contributing to the enhanced results in accordance herewith.

The addition of quite small amounts of an insoluble soap to many inorganic solid pigments may have the effect of altering the surface tension thereof to make the pigment more hydrophobic and even to an extent which may render dispersion thereof in oily vehicles more easily accomplished or may aid in causing the pigment to transfer from dispersion in an aqueous phase to dispersion in an oil phase without the necessity of drying from the aqueous phase and the mechanically re-dispersing in the oil phase, but such techniques are to be distinguished from the situation here with regard to not only the extent of the acid salt treatment and the quantity deposited on he pigment, but also with respect to the other results and interactions in accordance herewith and produced by or involving the insoluble fatty acid salt. For example, this invention is also applicable to various solid organic pigments, especially those which contain no free carboxyl or other groups reactive with the insoluble soaps, and under circumstances where the advantages produced by the pigment treatment do not relate to the dispersing ease or altering surface tension or making the organic pigments more hydrophobic than they may be inherently.

As generally illustrative of the proportion ranges involved in connection with the manufacture of pigmented wax articles such as lipsticks of the character to which this invention relates, it may be noted that a pigment such as titanium dioxide may exhibit pronounced tendencies to segregate or separate from other constituents in the molten wax dispersion during the cooling thereof in molding the article to produce noticeable streaks of agglomerated white pigment in the molded article and particularly if the pigment proportion range approximates perhaps two thirds of the wax composition. Even when there is more than about one third of untreated pigment in a wax lipstick, such segregation or agglomeration conditions may be noticeable after a layer of the composition has been applied to the lips and evidenced by caking of the pigment on the lips produced by the waxy components of the formulation being absorbed along the oleophilic surface of the skin and leaving the pigment behind as a dry cake.

Satisfactory results are achieved in accordance with this invention, however, and as applied particularly to lipsticks, if the wax article preferably includes around 5% to 10% of treated white pigment such as titanium dioxide, although as much as 80% (of the total pigment) can be incorporated in accordance herewith without the usual deleterious effects of having such a great amount of pigment, and with the pigment particles carrying a coating of insoluble metal fatty acid salt in an amount, preferably, of from 5% to 25% of the weight of pigment. Since the treating material hereof is not utilized solely to react with the pigment, although incorporated into the final composition as a coating on the pigment, specific pigment-to-soap ratios may not in all cases define incorporation into the entire wax composition of the optimum amount of fatty acid salt. For example, it has been found that amounts of calcium resinate in the finished lipstick exceeding about 1.5% by weight of the total lipstick may be considered as representing substantially a top limit beyond which further enhancement of all the various properties noted is not secured. With some formulations, amounts of the fatty acid salt above this level may begin to cause some softening of the molded wax so as to produce less than the optimum increased strength characteristics desired. Generally, satisfactory results are obtained with preferred or desired maximation of the various dispersing and coloring and strength or structure advantages noted, when the amount of insoluble fatty acid metal salt lies in the range of about 1.25% of the molded wax article, and such amounts of the insoluble soap are readily incorporated in the liquid or molten wax composition initially by adjusting the amount applied to the pigment (within, broadly, the 5% to 25% range on the weight of the pigment) depending upon the amount of treated pigment which is desired in the wax compositions.

Merely as illustrative of an example of treating a solid inorganic pigment with an insoluble metal salt of a fatty acid for satisfactory results in accordance with this invention, there may be noted forming a water slurry or dispersion comprising 3600 parts (by weight) of finely divided titanium dioxide pigment in about 12,000 parts of water, and including a small quantity (about 0.01%) of a detergent material (e.g., sodium lauryl sulfate) to aid in the dispersion of the pigment, which slurry was agitated vigorously for about 30 minutes to assure complete wetting of the pigment particles. To this water slurry was added 6000 parts of a 20% water solution of sodium resinate (equivalent to 1,200 parts of the salt) slowly and with agitation. Considerable foaming was noticed as indicating the expected surfactant or surface tension effect on the pigment produced by the sodium salt, and agitation was continued for an additional hour or so, after which the entire mixture was passed through a colloid mill to achieve optimum dispersion.

To the foregoing was then added 6000 parts of a 20% solution of calcium chloride (equivalent to 1200 parts of the salt) slowly and with agitation, during which addition the mixture thickened noticeably as the reaction progressed with evolution of heat and loss of water. After the calicum chloride addition was completed, the mixture was diluted to about 1.5 times the volume of the original slurry, agitated further, and then filtered to separate the treated solid pigment phase, which was washed with water several times until the chloride content was reduced to a negligible content. A 10% water slurry of the treated pigment showed a final pH of about 8.0-8.3, and the total yield of treated titanium dioxide pigment was about 4300 parts by weight, indicating a treatment resulting in deposition of a little less than 25% by weight of the insoluble calcium resinate on the titanium dioxide pigment.

Such pigment, then, may be dried or otherwise handled and/or dispersed or mixed in an oil vehicle or liquid or molten wax composition in accordance herewith as desired in well known manner. The metallic salt treatment although occurring at the surface of the pigment particles, does not interfere with the optical or other pigment uses thereof in the usual manner, although the treated pigment, as previously noted, possesses enhanced characteristics of oil absorption or other effects attributed to "livering," and is more readily dispersed in and maintained uniformly dispersed through waxy or oily vehicles than an equivalent quantity of untreated pigment, and possesses substantially less tendencies to agglomerate or settle or segregate in or from a liquid oil vehicle wax composition.

Also, purely for purposes of illustration, there may be noted pigmented wax formulations for providing a molded lipstick article in accordance herewith and utilizing the treated pigments of this invention, although, as will be understood, such treated pigments are available for obtaining the various advantages hereof with other types of wax formulations for producing lipsticks and other molded wax articles. As an example of a lipstick composition, however, may be noted a formulation as follows:

|  | Percent |
| --- | --- |
| Candelilla wax | 11 |
| Beeswax | 8 |
| Propylene glycol monolaurate | 6 |
| Isopropyl myristate | 5 |
| Lanolin | 11 |
| Mineral oil | 3 |
| Castor oil | 41 |
| Tetrabromofluorescene dye | 2 |
| Treated titanium dioxide | 10 |
| Colored pigments q.s. shade | 3 |

As will be understood from the foregoing, the various solid and liquid wax materials are blended or formulated to provide the desired softening point and consistency ranges, with the ester materials noted as being present in known manner for a coupling or blending effect among the various mineral and vegetable waxy materials and oils. The dye material is optionally added, as above noted and as well understood, for supplying a stain to the lips for extending or intensifying the coloring and coverage of the lipstick. As also will be understood, the variety and proportioning of the various wax materials in such a formulation is subject to wide latitude, as is the proportioning of the treated white and colored pigment materials depending upon the color and shade desired. Satisfactory results in accordance herewith are achieved, for example, with various proportions of white and colored pigments, and even with the treated titanium dioxide representing as little as 2% of the formulation as compared with 11% of various colored pigments, although, of course, in such a situation a higher proportion of calcium resinate should be incorporated on to the titanium dioxide pigment particles so as to introduce into the wax composition the desired quantity of insoluble fatty acid salt.

As will also be understood, a lipstick formulation, such as that indicated above, is prepared by admixing the various wax ingredients in molten form and satisfactorily, at a temperature of the order of about 80° to 85° C., while the dye and pigment materials are incorporated or dispersed in the molten wax mixture in known manner. In the course of obtaining the desired complete dispersion, the ingredients may be heated together for some three to six hours, during which time some of the reactions or interaction indicated above occur for producing the enhanced results or advantages in accordance herewith.

For example, in addition to enhancing the dispersion of the treated pigment, the insoluble soap material on the pigment particles also is mixed through the molten wax composition to have its effect on controlling or enhancing the grain or crystalline structure of the final matrix formed, and also undergoes whatever actual chemical reaction or transesterification may occur with acidic components of the waxes present. Similarly, the slightly alkaline pH imparted by the fatty acid salt induces the acidic dye material to undergo whatever color variation occurs with the dye in a slightly alkaline medium, so that the final color or shade of the dye is produced or preliminarily "developed" during the formulation of the wax composition and before being applied to the skin so that the color component contributed by the dye to the finished lipstick will be essentially the same as the color component contributed by the dye after application to the lips, instead of, as in the conventional case, having the dye undergo some color alteration or modification after application to the slightly alkaline skin of the wearer. Also, during the "cooking" or mixing formulation of the ingredients in the liquid mass, there occurs whatever color-enhancing effect the insoluble soap will have on the oil absorption surface characteristics or other color aspects of both the treated pigment and untreated colored pigments present to achieve the desired increase in brilliance or intensity, but without the concomitant gelling of the liquid mass or ultimate softening of the finished molded article as is associated with the use of "livering" agents to achieve similar results in these or other pigmented oil formulations.

After the heating and mixing and dispersing are all completed, the molten mass is cast into molds and allowed to cool and solidify to form the finished wax article, and it is during this cooling and solidification (obviously, without agitation) where the pigment treatment in accordance herewith produces one of the principal advantages hereof in maintaining the uniformity of dispersion of the various solid phase materials in the cooling liquid wax to avoid agglomeration or segregation or flotation effects which may be undesirable or disadvantageous.

The finished and solidified molded wax articles in accordance herewith possess appreciable and demonstrably different physical and mechanical characteristics as compared with similar molded articles including pigment phases which have not been subjected to the treatment in accordance herewith. For example, as purely illustrative of some of these enhanced qualities, lipsticks were compared as made from identical formulations except for the treatment of the titanium dioxide portion of the pigment phase with calcium resinate in accordance herewith. The finished lipsticks including the treated pigment exhibited a melting point or softening temperature of about 70.5° C., while those with untreated titanium dioxide showed 67.5° C. When the two sets of lipsticks were each bent slowly until the lipstick itself broke, the lipsticks including the treated pigment required 445 gms. of force to break, while those with untreated titanium dioxide broke at only 353 gms. The two sets of lipsticks were also tested for crush resistance in a manner to measure the amount of pressure to be applied to the lipstick transversely of the cross section thereof before the cylindrical stick would give way and crush (it being understood, of course, that wax in such lipsticks forms over the outside thereof a harder crystalline layer than in the center of the stick and that a point is reached where a pressing force causes the whole cross section of the stick suddenly to give way). Under such testing, the lipsticks including the treated pigment were not crushed by a force up to 17.0 p.s.i., while those including the untreated pigment were crushed at only 13.2 p.s.i.

In addition to the above noted mechanical or physical enhanced characteristics of lipsticks manufactured in accordance herewith, and in addition to the previously noted manufacturing or operational facility of enhanced dispersion and avoidance of gelling or thickening during manufacture, certain advantages in the use of the finished article are also demonstrably apparent in comparing otherwise identical lipsticks including treated pigment with those which have only untreated titanium dioxide. For example, without altering the applying characteristics desired by the user, lipsticks including the treated pigment exhibit longer and improved wear characteristics on the lips. Not only is there noted the advantage mentioned above of avoiding segregation of pigment as a "cake" from the oil vehicle in the layer applied to the lips, but there is also noted a longer lasting effect of the color on the lips. It may not be known whether this may be attributable to some increase in the water repellent characteristics of the pigment (to avoid sensitivity of saliva) or to an improved wetting of the skin by the dye and color components or to the more brilliant or intense color or to obtaining a better or more permanent stain on the slightly alkaline skin by the slightly alkaline lipstick, or merely to greater color brilliance because of better dispersion, or to combinations of the foregoing. Whatever the particular mechanism or explanation, however, all the foregoing advantages are demonstrably apparent and all are caused by or related to the particular pigment treatment in accordance herewith and the various synergistic reactions and interactions and effects of the treating materials in the molded wax composition and in the manufacture and use thereof.

Thus, as will be apparent from the foregoing, there are provided in accordance with this invention pigmented molded wax articles including a variety of enhanced characteristics and advantages relating to the manufacturing of the article, the physical and color characteristics of the finished article itself, and the ultimate uses to which the article is intended to be put, and with such advantages or enhanced characteristics involving or being related to treatment of the solid particle pigment or filler material phase with a substantial proportion of a special treating material such as a water-insoluble and oleophilic metal salt of a fatty acid for incorporation into the wax or oil vehicle of the finished composition as a coating or deposit upon the dispersed solid particles. Although the possible explanations for the enhanced characteristics and results achieved may be uncertain, they do relate to improving a variety of characteristics which bear no necessary dependent relationship to each other in the manufacturing steps or the physical characteristics of the finished article or the use thereof as a lipstick or other device. But all such advantages may be produced by the preliminary treatment noted of at least a portion of the solid pigment phase in the article, and are not present or produced in the absence of such pre-treatment.

Furthermore, treatment of the pigment phase in accordance herewith satisfactorily produces desirable effects which have otherwise been produced only along with concomitant disadvantages, so that following the teachings hereof provides either a pigmented article with one or more characteristics at least equivalent to the same characteristics in conventional articles but without the conventionally associated disadvantages, and/or pigmented wax articles having all the advantages hereof and thus uniformly superior to a wide variety of prior products which may have been individually superior in only one respect or another.

The processes and compositions and products in accordance herewith are to be distinguished from various other teachings in other arts for accomplishing effects perhaps related to some of the effects here, and are accomplished in accordance herewith in an inexpensive and readily practicable manner without requiring extensive additions to or reorganization of the conventional manufacturing processes for such articles, and produce molded wax articles including all the advantages hereof yet with accepted materials and with the article in familiar form so that long testing or trials are not required for commercial acceptance.

While the methods and compositions and products herein described constitute preferred embodiments of the invention, it is to be understood that the invention is not limited to these precise methods and compositions, and that changes may be made therein without departing from the scope of the invention which is defined in the appended claims.

What is claimed is:

1. A pigmented molded wax article for use in applying a layer of colored pigmented wax material to a surface by rubbing said article thereon, comprising a crystalline wax component formed into the form of said article, a solid pigment phase of discrete particles including a colored pigment uniformly dispersed through said molded component and forming therewith a self-sustaining matrix of enhanced strength and crush resistance for said article, at least a substantial proportion of said dispersed particles of said solid pigment phase carrying on the surfaces thereof a water-insoluble oleophilic treating material and being a metal salt of a fatty acid for maintaining said particles oleophilic and hydrophobic as dispersed in said article and in said layer of said pigmented material applied to said surface, and said colored pigment phase having greater oil absorption and color characteristics than the same amount of said pigment in the absence of said oleophilic treating material.

2. A pigmented formed wax article for use in applying a layer of colored pigmented wax material to a surface by rubbing said article thereon, comprising a crystalline wax component cast into the form of said article, a solid inorganic pigment phase of discrete particles uniformly dispersed through said molded wax component, at least a substantial proportion of said dispersed particles of said solid pigment phase carrying on the surfaces thereof a water-insoluble oleophilic treating material and being a metal salt of a fatty acid and having an alkaline pH for maintaining said particles oleophilic and hydrophobic as dispersed in said article and in said layer of said pigmented material applied to said surface, and an acid dye material having a developed color in the presence of said alkaline pH.

3. A pigmented molded wax article for use in applying a layer of colored pigmented wax material to a surface by rubbing said article thereon, comprising a crystalline wax component cast into the form of said article, a solid pigment phase of discrete particles including both white and colored pigments uniformly dispersed through said molded component, said dispersed white pigment particles carrying on the surfaces thereof a water-insoluble oleophilic treating material for maintaining said particles oleophilic and hydrophobic as dispersed in said article and in said layer of said pigmented material applied to said surface, and said pigment phase having greater oil absorption and color characteristics than the same amount of said pigment in the absence of said oleophilic treating material.

4. A pigmented molded wax article for use in applying a layer of pigmented wax material to a surface by rubbing said article thereon, comprising a crystalline wax component cast into the form of said article, a solid inorganic pigment phase of discrete particles uniformly dispersed through said molded wax component and forming therewith a self-sustaining matrix of enhanced strength and crush resistance for said article, at least a substantial proportion of said dispersed particles of said solid pigment phase carrying on the surfaces thereof a water-insoluble oleophilic treating material and being a metal salt of a fatty acid and having an alkaline pH for maintaining said particles oleophilic and hydrophobic as dispersed in said article and in said layer of said pigmented material applied to said surface, and said article also including an insoluble soap material which is a reaction product of said alkaline fatty acid metal salt and at least a portion of the waxy ingredients of said wax component.

5. A pigmented molded wax article for use in applying a layer of pigmented wax material to a surface by rubbing said article thereon, comprising a crystalline wax component cast into the form of said article, and a solid pigment phase of discrete particles uniformly dispersed through said molded wax component and forming therewith a self-sustaining matrix of enhanced strength and crush resistance for said article, at least a substantial proportion of said dispersed particles of said solid pigment phase carrying on the surfaces thereof a water-insoluble oleophilic treating material for maintaining said particles oleophilic and hydrophobic as dispersed in said article and in said layer of said pigmented material applied to said surface.

6. A pigmented formed wax article for use in applying a layer of pigmented wax material to a surface by rubbing said article thereon, comprising a crystalline wax component formed into the form of said article, a solid inorganic colored pigment phase of discrete particles uniformly dispersed through said molded wax component and forming therewith a self-sustaining matrix of enhanced strength and crush resistance for said article, at least a substantial proportion of said dispersed particles of said solid pigment phase carrying on the surfaces thereof a water-insoluble oleophilic treating material and being a metal salt of a fatty acid and having an alkaline pH for maintaining said particles oleophilic and hydrophobic as dispersed in said article and in said layer of said pigmented material applied to said surface, and a dye for further coloring said wax article and said layer of material as applied to said surface, said colored pigment phase having greater oil absorption and color characteristics than the same amount of said pigment in the absence of said oleophilic treating material, and said article also including an insoluble soap material which is a reaction product of said fatty acid metal salt and at least a portion of the waxy ingredients of said wax component.

7. In a method for producing pigmented molded wax articles for use in applying a layer of pigmented wax material to a surface by rubbing said article thereon, the steps which comprise forming a water slurry of dispersed solid inorganic pigment particles, depositing on the surfaces of said dispersed particles a water-insoluble oleophilic treating material including a metal salt of a fatty acid, forming a molten mixture of wax materials as the wax component of said molded article, dispersing said pigment particles with said oleophilic treating material thereon uniformly throughout said molten wax component, maintaing said molten mixture with said dispersed particles therein at an elevated temperature effecting reaction between waxy components in said mixture and said alkaline treating material on said dispersed particles, casting said thus-treated admixture of all said ingredients into a mold in the shape of said molded article, and cooling said cast admixture in said mold to form said article.

8. In a method for producing pigmented molded wax articles for use in applying a layer of pigmented wax material to a surface by rubbing said article thereon, the steps which comprise forming a water slurry of dispersed solid pigment particles, depositing on the surfaces of said dispersed particles in said water slurry a water-insoluble oleophilic treating material and being a metal salt of a fatty acid and having an alkaline pH, forming a molten mixture of wax materials as the wax component of said molded article, dispersing said pigment particles with said oleophilic treating material thereon uniformly throughout said molten wax component, admixing with said dispersion an acid dye which undergoes a color change when exposed to an alkaline medium, maintaining said molten mixture with said dye and said dispersed particles therein at an elevated temperature effecting reaction between waxy components in said mixture and said alkaline treating material on said dispersed particles and effecting development of said alkaline color of said acid dye in the presence of said alkaline treating material on said dispersed particles, casting said thus-treated admixture of all said ingredients into a mold in the shape of said molded article, and cooling said cast admixture in said mold to form said article, said oleophilic treating material maintaining said pigment particles uniformly dispersed through said article during cooling thereof for forming with said wax component a self-sustaining matrix structure of enhanced strength and crush resistance in said article.

9. In a method for producing pigmented molded wax articles for use in applying a layer of colored pigmented wax material to a surface by rubbing said article thereon, the steps which comprise forming a water slurry of dispersed solid pigment particles, depositing on the surfaces of said dispersed particles in said water slurry a water-insoluble oleophilic treating material and being a metal salt of a fatty acid for rendering said particles oleophilic and oil absorptive, forming a molten mixture of wax materials as the wax component of said molded article, dispersing said pigment particles with said oleophilic treating material thereon uniformly throughout said molten wax component, dispersing other colored pigment particles in said mixture to form a dispersed phase of colored pigment, maintaining said molten mixture with said dispersed particles therein at an elevated temperature effecting livering of the color imparted by said pigment to said wax article and to said applied layer thereof substantially in the absence of gelling and thickening of said molten mixture, casting said thus-treated admixture of all said ingredients into a mold in the shape of said molded article, and cooling said cast admixture in said mold to form said article, said oleophilic treating material maintaining said pigment particles uniformly dispersed through said article during cooling thereof for forming with said wax component a self-sustaining matrix structure of enhanced strength and crush resistance in said article.

10. In a method for producing pigmented molded wax articles for use in applying a layer of pigmented wax material to a surface by rubbing said article thereon, the steps which comprise forming a water slurry of dispersed solid inorganic pigment particles, admixing with said dispersed particles in said water slurry a solution of fatty acid salt, converting said salt in said slurry to a water-insoluble metal salt of said fatty acid precipitated on said dispersed particles in said slurry as a water-insoluble oleophilic treating material having an alkaline pH, forming a molten mixture of wax materials as the wax component of said molded article, dispersing said pigment particles with said oleophilic treating material thereon uniformly throughout said molten wax component, maintaining said molten mixture with said dispersed particles therein at an elevated temperature effecting reaction between waxy components in said mixture and said alkaline treating material on said dispersed particles, casting said thus-treated admixture of said ingredients into a mold in the shape of said molded article, and cooling said cast admixture in said mold to form said article, said oleophilic treating material maintaining said pigment particles uniformly dispersed through said article during cooling thereof and forming with said wax component a self-sustaining matrix structure of enhanced strength and crush resistance in said article.

References Cited by the Examiner

UNITED STATES PATENTS 2,873,229  2/59  Wick _____ 167—85

OTHER REFERENCES

Bayer, Chem. Abst., vol. 54, p. 11512(f) 1960.
Gironde, Chem. Abst., vol. 51, p. 6186(b), 1957.

JULIAN S. LEVITT, *Primary Examiner.*

MORRIS O. WOLK, LEWIS GOTTS, *Examiners.*